Dec. 24, 1963     O. ROGG     3,115,064
GEAR SHAVING MACHINE
Filed Aug. 10, 1961     5 Sheets-Sheet 3

INVENTOR.
Otto Rogg
BY
*Richard I. Striker*
his ATTORNEY

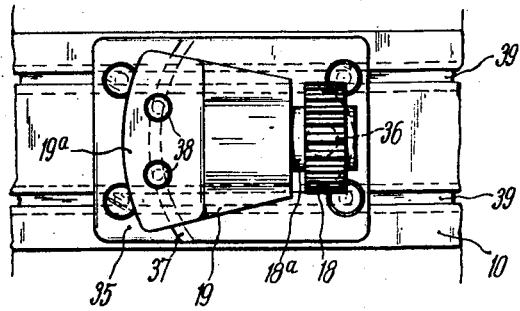
Fig. 6
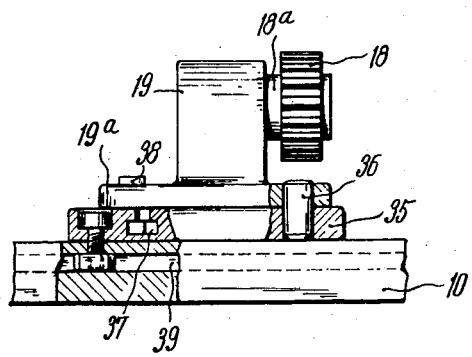
Fig. 7
Fig. 13
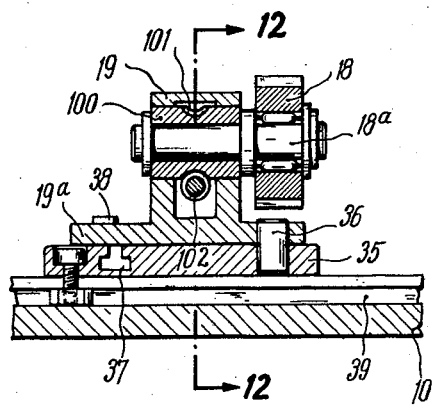
Fig. 12
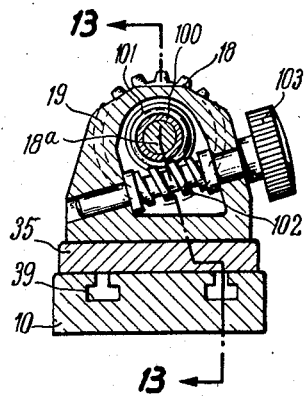
INVENTOR.
Otto Rogg
BY
Michael S. Striker
his ATTORNEY

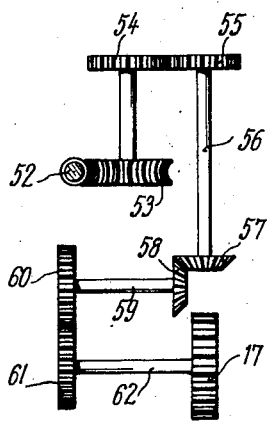
Fig. 8
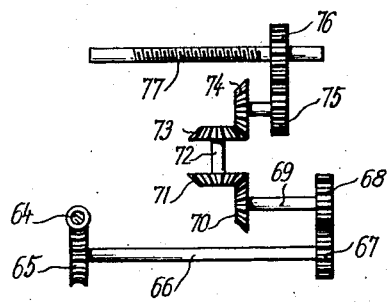
Fig. 9
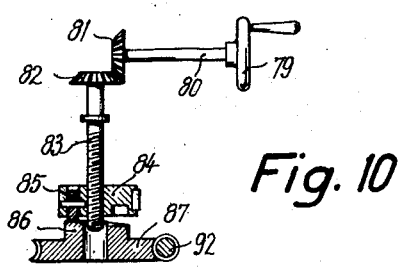
Fig. 10
Fig. 11
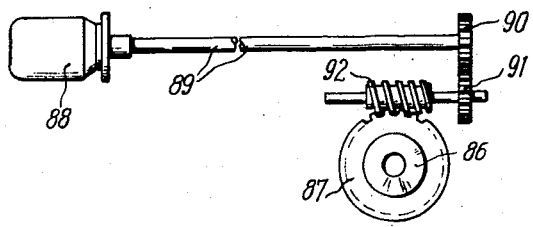

United States Patent Office 3,115,064
Patented Dec. 24, 1963

3,115,064
GEAR SHAVING MACHINE
Otto Rogg, Munich, Germany, assignor to
Carl Hurth, Munich, Germany
Filed Aug. 10, 1961, Ser. No. 130,624
Claims priority, application Germany Aug. 19, 1960
23 Claims. (Cl. 90—1.6)

The present invention relates to gear finishing apparatus in general, and more particularly to a rotary gear shaving machine.

Gear shaving machines are utilized to improve surface finish and to correct inaccuracies in the profile of gear teeth such as develop during the gear cutting operation. However, certain other errors developing in the gear cutting operation cannot or are corrected only slightly with presently known gear shaving machines of which I am aware at this time. For example, if the gear cutting operation produces an eccentric gear, the eccentricity normally cannot be eliminated by the gear shaving process; at best, the eccentric gear blank is transformed into one with an error in tooth-to-tooth spacing. Another drawback of known gear shaving machines is that they normally produce typical errors in the shape of gear teeth which can be eliminated only if the shaving cutter is adjusted with utmost accuracy relative to the workpiece. In order to insure that the cutter is properly adjusted with respect to the workpiece, only a very small portion of the cutter's profile can conjugate with an equally small portion of the part to be shaved.

An object of the present invention is to provide a gear shaving machine which avoids the drawbacks of known machines or which at least insures that at least some errors not correctable with known gear shaving machines may be corrected in a very simple and efficient manner.

Another object of the invention is to provide a gear shaving machine of the just outlined characteristics wherein all surfaces on the teeth of the workpiece are shaved uniformly even if the workpiece is not centered with great accuracy with respect to the cutter or vice versa.

A further object of the invention is to provide a gear shaving machine which insures that all surfaces on the teeth of a workpiece are uniformly shaved even if the gear cutting operation has produced eccentricity, improper tooth-to-tooth spacing, profile inaccuracy or other errors.

An additional object of the instant invention is to provide a gear shaving machine of the above described type which is capable of substantially reducing or of completely eliminating errors in tooth-to-tooth spacing all the way about a workpiece, which is capable of producing gears wherein the profile diagrams of finished teeth are much more uniform than upon treatment in heretofore known gear shaving machines, which insures that the cutter and the workpiece remain in proper mesh throughout the entire shaving operation and thereby prevents undesirable leading or lagging of the cutter, and which may be utilized in connection with many types and many sizes of workpieces.

With the above objects in view, the invention resides in the provision of a gear shaving or precision finishing machine which comprises rotary cutting means, such as a gear-shaped cutting tool with serrated teeth, means preferably assuming the form of a rotary propping gear which is adjacent to but spaced from the cutting tool, and means for floatingly supporting the workpiece between and in engagement with the cutting tool and the propping gear whereby, upon rotation of the cutting tool, the latter's serrated teeth remove shavings from the teeth of the workpiece and the cutting tool exerts radial pressure against and maintains the workpiece in proper mesh with the propping gear.

Certain other features of the invention reside in the provision of infeed means for adjusting the cutting tool and/or the propping gear with respect to each other and preferably radially with respect to the workpiece so as to change the thickness of shavings removed from the teeth of the workpiece, in the provision of specially constructed infeed means which may be operated by hand or which may be driven by a suitable motor, in the provision of means for permitting adjustments of the cutting tool and preferably also of the propping gear with respect to the workpiece so that the axis of the workpiece may be parallel with or may cross the axis of the cutting tool and of the propping gear, in the provision of means for imparting to the workpiece and to the propping gear feed- and rocking movements such as are necessary for the shaving of crowned or uncrowned teeth on cylindrical or conical spur, bevel or internal gears, in the provision of means for preventing the shavings removed by the teeth of the cutting tool from penetrating between the workpiece and the propping gear, in the provision of specially constructed means for floatingly supporting the workpiece between the cutting tool and the propping gear, and in the provision of specially constructed means which drives the cutting tool so that the latter may rotate the workpiece and the propping gear.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 6 is an enlarged top plan view of the novel propping means and of the bearing member therefor;

FIG. 7 is a partly elevational and partly sectional view of the structure shown in FIG. 6;

FIG. 8 is a somewhat schematic view of the gear train which drives the shaving tool;

FIG. 9 is a similar schematic view of the gear train which transmits reciprocatory motion to the bed of the workpiece;

FIG. 10 is a schematic view of the manually operable infeed means;

FIG. 11 is a schematic view of the motor-driven infeed means;

FIG. 12 is an enlarged transverse section through the bearing member of the propping means which accommodates a modified infeed means, the section of FIG. 12 being taken along the line 12—12 of FIG. 13, as seen in the direction of arrows; and FIG. 13 is a section taken along the line 13—13 of FIG. 12, as seen in the direction of arrows.

Figure 1:
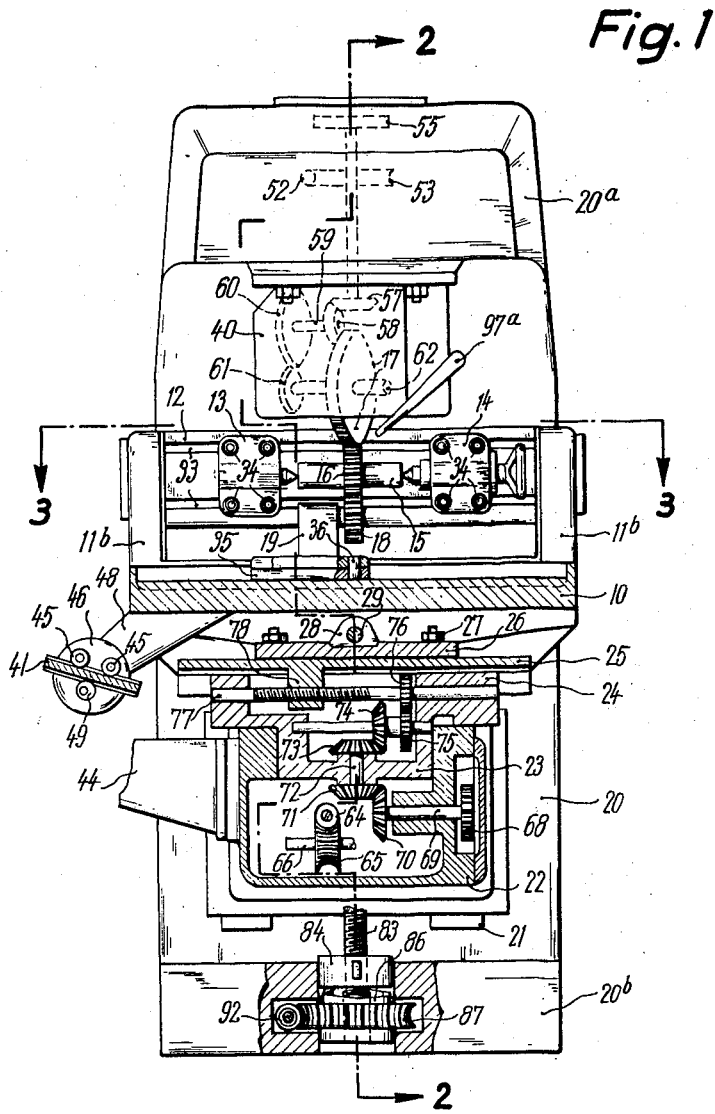
FIG. 1 is a partly front elevational and partly vertical sectional view of a rotary gear shaving machine embodying my invention, the section of FIG. 1 being taken along the line 1—1 of FIG. 2, as seen in the direction of arrows.
Figure 2:
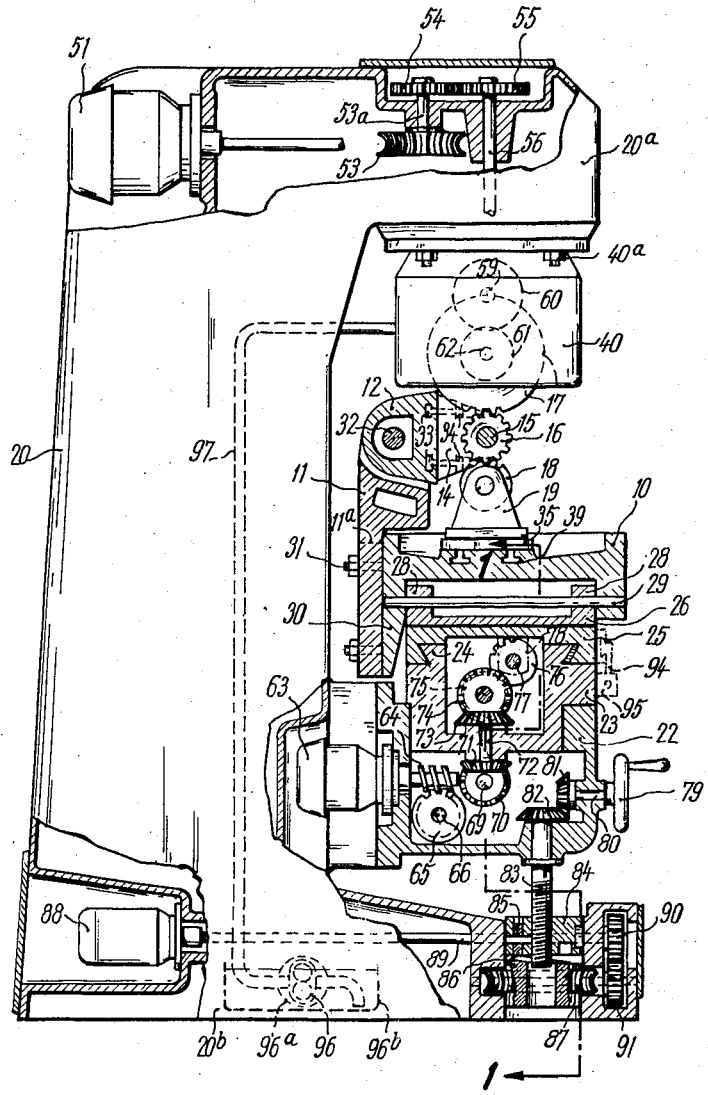
FIG. 2 is a partly side elevational and partly vertical sectional view of the gear shaving machine, the section of FIG. 2 being taken along the line 2—2 of FIG. 1, as seen in the direction of arrows.
Figure 3:
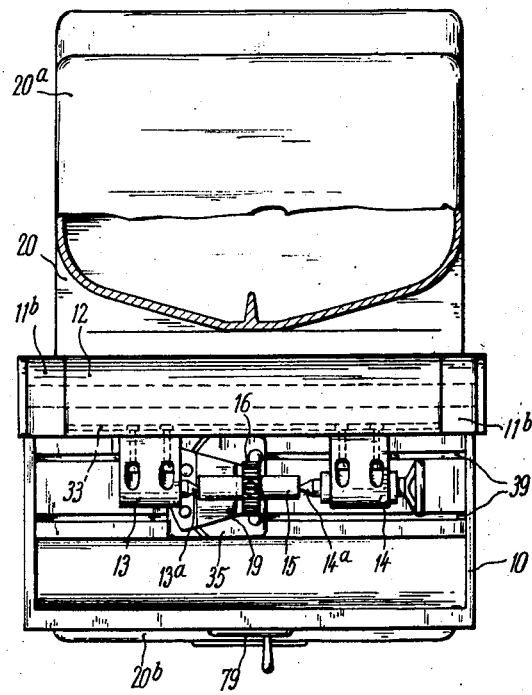
FIG. 3 is a partial top plan and partial horizontal sectional view of the gear shaving machine, the section of FIG. 3 being taken along the line 3—3 of FIG. 1, as seen in the direction of arrows.

Referring now in greater detail to the illustrated embodiment, and first to FIGS 1, 2 and 3, there is shown a rotary gear shaving machine which comprises a main supporting means or frame 20 formed with vertical guideways 21 for a vertically reciprocable console or carrier 22. This carrier supports a rotary table 23 which is turnable therein about a vertical axis and is provided with means, not shown, for holding it in a selected angular position. The upper side of the table 23 is formed with horizontal ways 24 for a horizontally reciprocable carriage 25. This carriage is reciprocable from the right to the left or vice versa, as viewed in FIG. 1, and supports an angularly adjustable or turnable base plate 26. The axis about which the base plate 26 is turnable coincides with the vertical axis of the rotary table 23. The plate 26 may be fixed to the carriage 25 in each of a number of angular positions by means of bolts and nuts 27. As best shown in FIG. 2, the plate 26 is formed with upwardly extending bearing brackets 28 for a horizontal pivot axle 29 which carries a worktable or bed 10. The rear portion of the bed 10 (i.e. its left-hand portion, as viewed in FIG. 2) extends downwardly along the base plate 26 and along the carriage 25, and has a flat vertical end face 30 which abuts against an adjustable bearing member or block 11, the latter secured to the bed 10 by bolts and nuts 31. As indicated in FIG. 2, the bolts for the nuts 31 are fixed to the bed 10 and extend through elongated vertical slots 11a formed in the block 11 so that the latter may be vertically adjusted with respect to the bed 10 and may be fixed in any desired position of adjustment. Alternately, the bolts for the nuts 31 may extend into T-shaped vertical grooves or guideways in the end face 30 so that the block 11 is again vertically adjustable along the face 30. Vertical adjustments of the block 11 are necessary because this block carries the workpiece or blank 16 and the diameters of the workpieces which may be shaved in the apparatus of FIGS. 1–3 often vary within a wide range.

The block 11 comprises two spaced upwardly extending arms or brackets 11b for a holder 12 which is connected thereto by means of a horizontal pivot axle 32 mounted in the arms 11b so that the holder is pivotable with respect to the bed 10. The holder 12 is provided with a pair of spaced work supporting means here shown as a headstock 13 and a tailstock 14. These work supporting means are adjustable in horizontal direction and transversely of the frame 20, as viewed in FIG. 1, in T-shaped grooves or guideways 33 provided in the front face of the holder 12, and may be fixed in a given position by a series of bolts and nuts 34. In the illustrated embodiment, the workpiece 16, e.g. a prefabricated spur gear, is mounted on a mandrel 15 which is held between the centers 13a, 14a of the respective work supporting means. The parts 11–14 and 32 together constitute means for floatingly supporting the workpiece 16 on the bed 10. Of course, it will be readily understood that the workpiece 16 may be engaged directly by the centers 13a, 14a or that the means 13, 14 may support the workpiece in another way.

Figure 5:
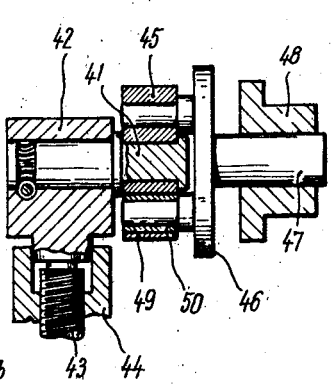
FIG. 5 is an enlarged section as seen in the direction of arrows from the line 5—5 of FIG. 4.

The holder 12 is freely swingable about the axis of the pivot member 32 to the extent permitted by a toothed member here shown as a spur gear 18 which acts as a bracing or propping means for and meshes with the workpiece 16. The gear 18 is rotatably mounted in a bearing member 19 by means of a shaft 18a (see FIGS. 4 and 5), and this bearing member is swingable about the vertical axis of a pin 36 which extends radially with respect to the axis of the propping gear 18 and which is turnably mounted in a supporting plate 35, the latter mounted in T-shaped guideways or grooves 39 provided in the upper side of the bed 10. The upper side of the supporting plate 35 is provided with an arcuate T-shaped guideway or groove 37 whose center of curvature coincides with the axis of the pin 36, and this groove 37 receives the heads of arresting bolts 38 which extend through vertical bores of the flange 19a forming part of the bearing member 19 and whose upper ends may receive suitable nuts by means of which the bearing member 19 is releasably held in a selected angular position with respect to the pin 36. Thus, the bearing member 19 is adjustable in a horizontal direction longitudinally of the bed 10 and transversely of the frame 20, as viewed in FIG. 1, and is also turnable about the vertical axis of the pin 36 so that the axes of the gear 18 and of the workpiece 16 may cross each other. In the position of FIGS. 1 and 2, the axes of the gear 18 and of the workpiece 16 are assumed to be parallel with each other. The grooves 39 enable the operator to adjust the position of the propping gear 18 in the axial direction of the workpiece.

The upper part or head 20a of the frame 20 overhangs the bed 10 and the holder 12, and serves as a means for preferably angularly adjustably supporting a holder 40 for the gear-type shaving cutter or tool 17. This tool also assumes the form of a gear whose teeth are formed with serrations as is well known in the art. As shown in FIG. 1, the teeth of the workpiece 16 mesh with the teeth of the tool 17 but the latter's axis encloses a predetermined angle with the axis of the mandrel 15, i.e. the axis of the tool crosses the axis of the workpiece. The tool 17 usually does not have the same helix angle in degrees as that of the workpiece 16, and the magnitude of the crossed-axis angle governs the shaving action. Since the workpiece is pivotable with the holder 12 about the axis of the pivot member 32, it actually floats between the tool 17 and the propping gear 18.

The means for driving the tool 17 comprises an electric motor 51 which is mounted in the head 20a of the frame 20 and which drives a gear train including a horizontal worm 52 meshing with a worm wheel 53 whose vertical shaft 53a carries at its upper end a spur gear 54 in mesh with a second spur gear 55 provided at the upper end of a vertical drive shaft 56. The axis of the drive shaft 56 coincides with the axis about which the tool holder 40 is adjustable. The latter may be fixed to the head 20a of the frame 20 by means of bolts and nuts 40a. The lower end of the drive shaft 56 extends into the interior of the tool holder 40 and carries a bevel gear 57 which mates with a second bevel gear 58 provided at one end of a horizontal shaft 59 whose other end carries a spur gear 60 in mesh with a pinion 61 on the horizontal spindle 62 of the tool 17. The parts 54, 55 constitute a speed reducing gearing and may be replaced by a suitable transmission of any known design. The bevel gears 57, 58 remain in mesh and may transmit rotary motion to the shaft 59 even if the tool holder 40 is angularly adjusted about the axis of the vertical drive shaft 56 so as to change the angle enclosed by the axes of the tool 17 and workpiece 16. The gear train for driving the tool 17, with the exception of the bearing for the parts 53a, 56, 59 and 62, is shown diagrammatically in FIG. 8.

As stated above, the bed 10 is tiltable or rockable about the axis of the pivot member 29 which enables an operator to form longitudinally (i.e. axially) crowned teeth on the workpiece 16. Such rocking movements of the bed 10 are controlled by a flat cam or guide means 41 which is connectable to a bearing element 42 and which may be arrested in a series of positions, see also FIGS. 4 and 5. The bearing element 42 is mounted on a spindle 43 meshing with a holder element 44 fixed to the carrier 22. The upper side of the cam 41 engages with a pair of follower rollers 45 which are secured to a disk-shaped support 46 mounted on a trunnion or journal 47 received in a bore of an arm 48, the latter secured to the bed 10. The support 46 and the follower rollers 45 are turnable about the axis of the trunnion 47, and the latter is axially movable in the arm 48. The support 46 carries a third follower roller 49 which engages the underside of the cam 41. The follower roller 49 is mounted on an eccentric sleeve 50 which may be adjusted in such a way that it presses the roller 49 against the underside of the cam.

41 in order to insure that the latter is held without any undesirable play between the upper rollers 45 and the lower roller 49.

If the cam 41 is parallel with the ways 24 on the table 23, the machine may be used for shaving of uncrowned teeth on cylindrical gears. In such instances, the bed 10 may be rigidly fixed to the carriage 25, i.e. it need not be rockable about the axis of the pivot member 29 if the teeth of a cylindrical workpiece are not crowned.

On the other hand, if the cam 41 remains parallel with the ways 24 but is not parallel with the bed 10, the machine may be used for shaving the teeth of conical gears. Of course, in such instances, the propping gear 18 must be replaced by a conical gear which will remain in proper mesh with the workpiece when the latter is driven by the tool.

If the cam 41 assumes a position as shown in FIG. 1, i.e. if it is inclined with respect to the ways 24, the bed 10 will be rocked about the axis of the pivot member 29 whenever the carriage 25 is moved to the right or left, as viewed in FIG. 1, so that the machine may be used for shaving of crowned gear teeth. By suitable adjustments of the cam 41 at different elevations, the apparatus may be used for shaving of crowned teeth on conical gears.

The means for reciprocating the carriage 25 with the bed 10 in the longitudinal direction of the ways 24 comprises a reversible electric motor 63 which is mounted in the carrier 22 and whose output shaft drives a gear train including a worm 64 meshing with a worm wheel 65 provided on the horizontal shaft 66 of a pinion 67 (see particularly FIG. 9) which in turn meshes with a spur gear 68 provided on a shaft 69. The shaft 69 carries a bevel gear 70 which mates with a second bevel gear 71 connected to the lower end of a vertical shaft 72 whose upper end carries a third bevel gear 73 in mesh with a fourth bevel gear 74 on a horizontal shaft 74a, the latter rigid with a spur gear 75 which meshes with a spur gear 76 on a horizontal spindle 77. The spindle 77 is parallel with the ways 24, and its external threads mesh with internal threads of a downwardly extending projection or spindle nut 78 forming part of or fixed to the underside of the carriage 25. The axis of the shaft 72 coincides with the axis about which the table 23 is turnable in the carrier 22. The gears 67, 68 together constitute a speed reducing gearing which may be replaced by a suitable transmission.

The carrier 22 is adjustable in its vertical guideways 21 (infeed) either by hand or by means of a motor. The manual adjusting or infeed means, shown in FIGS. 1, 2 and 10, comprises a gear train including a handwheel 79 which is disposed at the front side of the carrier 22 and which may rotate a horizontal shaft 80 provided with a bevel gear 81 which meshes with a second bevel gear 82 provided at the upper end of a vertical spindle 83. This spindle meshes with a spindle nut 84 which is axially movably but nonrotatably mounted in the bottom portion or pedestal 20b of the frame 20. The spindle nut 84 is provided with a roller 85 which is turnable about a horizontal axis and which rests on the inclined upper face of a cam member 86, the latter mounted on or forming an integral part of a worm wheel 87. The worm wheel 87 rests on a suitable horizontal surface provided in the pedestal 20b. When the handwheel 79 is turned, the spindle 83 moves with respect to the spindle nut 84 and either lifts or lowers the carrier 22, depending on the direction in which the handwheel is rotated.

Figure 4:
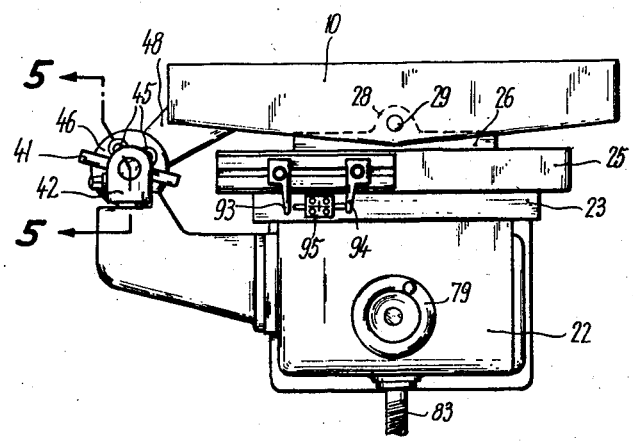
FIG. 4 is a front elevational view of a detail of the gear shaving machine, showing a cam which controls the rocking movements of the workpiece during shaving of crowned gear teeth.

FIGS. 1, 2 and 11 show the motor-driven second adjusting or infeed means for the carrier 22. This adjusting means comprises a reversible electric motor 88 which is mounted in the pedestal 20b and which is a so-called braked motor in that it is automatically braked as soon as its circuit is opened in order to reduce to a minimum the duration of its uncontrolled rotation. The motor 88 drives a horizontal shaft 89 which is provided with a spur gear 90 meshing with a second spur gear 91 mounted on the shaft of a horizontal worm 92 meshing with the worm wheel 87. The gears 90, 91 constitute a gear reducer which may be replaced by a transmission. As shown in FIG. 4, the motor 88 is controlled by a limit switch comprising two contacts 93, 94 adjustably mounted on the carriage 25 and a stationary contact 95 on the table 23. The contacts 93, 94 respectively complete and open the circuit of the motor 88 when they come into engagement with the fixed contact 95. Depending on the distance between the contacts 93, 94, on the speed at which the carriage 25 is moved, and on the inclination of the cam face on the member 86, the extent of vertical adjustment of the carrier 22 may be selected as desired. When the gear shaving operation is terminated, the cam member 86 has completed a full revolution or alternately, the motor 88 must be driven in the opposite direction to return the cam member 86 to its initial position.

The angularly adjustable table 23 and the base plate 26 render it possible to move the bed 10 in directions parallel with or inclined relative to the axis of the workpiece 16. If the teeth of the workpiece are not crowned, the table 23 may be dispensed with and the bed 10 may be mounted directly on the carrier 22. In such simplified gear shaving machines, the driving arrangement of FIG. 9 may be omitted.

Referring back to FIGS. 1 and 2, the shavings removed from a workpiece 16 may be blown away or carried away so as to prevent their entry between the meshing teeth of the parts 16–18. In the illustrated embodiment, the means for preventing the shavings from penetrating between the workpiece and the propping gear comprises a pump 96 mounted in the pedestal 20b and driven by an electric motor 96a so as to advance a suitable cutting or cooling fluid from a source 96b in the pedestal 20b through a fluid conveying conduit 97 and to a nozzle 97a provided at the discharge end of the conduit 97. This nozzle may be directed against that tooth of the workpiece which is just moved out of mesh with the mating tooth of the tool 17 so that the stream of cooling or cutting fluid discharged by the nozzle 97a prevents the shavings from moving toward the propping gear 18. The fluid and the shavings may be collected in a suitable tray or chute, not shown.

Instead of the infeed means shown in FIGS. 10 and 11, the gear shaving machine of my invention may be provided with a simplified infeed means which is shown in FIGS. 12 and 13. The advantage of this simplified infeed means is that it merely requires adjustments in the position of the propping gear 18 with respect to the tool 17 and substantially radially of the workpiece rather than adjustments in the position of the carrier 22 in the vertical guideways 21 and of all parts which are mounted on the carrier. As shown in FIGS. 12 and 13, the shaft 18a of the propping gear 18 is mounted in an eccentric sleeve 100 which is angularly adjustably received in the bearing member 19 and whose median portion constitutes a worm wheel 101 meshing with a worm 102. The shaft of the worm 102 extends from the bearing member 19 and is provided with a manually operable wheel 103 by means of which the angular position of the eccentric sleeve 100 may be adjusted to thereby adjust the distance between the propping gear 18 and the tool 17. If the propping gear 18 is lifted, it bears with a greater radially oriented force against the workpiece and urges the latter substantially radially against the tool 17 to increase the gear shaving action, i.e. the thickness of the shavings removed from the teeth of the workpiece is increased. On the other hand, when the handwheel 103 is turned in a direction to lower the propping gear 18, the thickness of shavings removed from the teeth of the workpiece by the serrated teeth of the tool 17 is reduced accordingly.

It will be readily understood that the manually operable worm drive 101–103 may be modified by omitting the wheel 103 and by connecting the shaft of the worm 102 with the braked motor 88 through the reducing gearing 90, 91.

It will be noted that, if the gear shaving machine of my invention is utilized for shaving of crowned gear teeth on cylindrical or conical workpieces, the bed is capable of performing a large number of movements including an infeed movement to change the distance between the workpiece and the tool, a feeding movement to move the workpiece in or at an angle to the axial direction of the tool, and a rocking movement necessary in shaving of crowned gear teeth.

In the embodiment of FIGS. 1 to 3, the axis of the pivot member 32 is parallel to the axis of the workpiece 16, and the propping gear 18 meshes with the workpiece at a point substantially diametrically opposite the point of engagement between the workpiece and the tool 17.

The centers 13a, 14a constitute two friction cones which exert a braking action on the workpiece 16 through the mandrel 15 to eliminate play between the teeth of the workpiece and the teeth of the tool 17. Such braking action eliminates or reduces errors in the shape of shaved gear teeth by damping the vibrations of the workpiece. Similar or otherwise constructed braking means may be provided for the propping gear 18.

The gear 18 cooperates with the swingable holder 12 to insure uniform removal of shavings from all teeth of the workpiece 16 regardless of the eccentricity of the workpiece because the holder is adapted to be rocked about the axis of the pivot member 32 so that the shaving action of the tool 17 remains constant while the work supporting means 13, 14 are rocked with an elliptical workpiece about the axis of the member 32. The means 13, 14 perform the same function if the workpiece 16 is eccentrically supported by the centers 13a, 14a. Furthermore, the tooth-to-tooth spacing is uniform in all zones of the finished workpiece and the involute chart of the finished workpiece is more uniform than upon finishing with known gear shaving machines, i.e. the involute charts (also called diagrams of the true involute) do not exhibit a rising or a falling characteristic as is the case if an eccentric workpiece is finished in a conventional gear shaving machine.

Additional advantageous finishing action is brought about by the friction generated between the meshing portions of the workpiece 16 and the propping gear 18 by the pressure exerted upon the workpiece by the tool 17. The friction between the teeth of the workpiece 16 and the propping gear 18 counteracts the tendency of the workpiece to move to a position in which the pressure of the tool 17 thereagainst is reduced, i.e. the friction between the workpiece and the gear 18 prevents the workpiece from leading or lagging behind the tool. Of course, it will be readily understood that the holder 40 of the tool 17 may embody suitable braking or friction producing means for the tool, and that such braking or friction producing means may be provided in addition to or instead of the braking means for the workpiece and/or the propping gear 18.

As is clearly shown in FIG. 2, the workpiece 16 actually floats between the tool 17 and the propping gear 18. Therefore, the radial pressure exerted by the tool 17 against the workpiece remains unchanged during the entire gear shaving operation because the workpiece is free to pivot about the axis of the pivot member 32 between the parts 17, 18 whose axial distance remains unchanged during the gear shaving operation if the machine assumes the form as shown in the drawings.

According to a slight modification of my invention which is not illustrated in the drawings, the workpiece 16 may float between the tool 17 and the propping gear 18 if the bed 10 is mounted in such a way that it rigidly supports the workpiece but is freely reciprocable (within a certain range) in directions substantially perpendicular to and in a plane substantially common to the axes of the parts 17, 18. An important feature of the invention resides in the provision of the propping gear 18, and the means for insuring that the workpiece remains in proper engagement with the gear 18 may assume a number of different forms, i.e. the workpiece should not be permitted to roll off the propping gear.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be protected by Letters Patent is:

1. In a machine for precision finishing the teeth of gears and like workpieces, in combination, rotary cutting means; rotary propping means; and means for floatingly supporting the workpiece between and in engagement with said cutting means and said propping means with the cutting action being performed only by said cutting means.

2. In a machine for shaving the teeth of gears and like work-pieces, in combination, rotary cutting means; rotary propping means spaced from said cutting means and having smooth sustaining faces; and means for floatingly supporting the workpiece between and in engagement with said cutting means and said smooth sustaining faces of said propping means so that said cutting and propping means respectively engage with substantially diametrically opposite portions of the workpiece.

3. In a machine for shaving the teeth of gears and like workpieces, in combination, rotary cutting means; means for driving said cutting means; rotary propping means spaced from said cutting means and having smooth sustaining faces; and means for rotatably and floatingly supporting the workpiece between and in engagement with said cutting means and said smooth sustaining faces of said propping means so that the cutting means shaves the teeth of and rotates the workpiece, and the workpiece rotates the propping means.

4. In a machine for precision finishing the teeth of gears and like workpieces, in combination, rotary cutting means; rotary propping means having smooth sustaining faces; means for floatingly supporting the workpiece between and in engagement with said cutting means and said smooth sustaining faces of said propping means; and infeed means for adjusting the position of said propping means with respect to said cutting means in directions substantially radially of the workpiece.

5. In a machine for precision finishing the teeth of gears and like workpieces, in combination, rotary cutting means comprising a gear shaped tool having serrated teeth; means comprising a bearing member and a non-cutting propping gear rotatably mounted in said bearing member and spaced from said tool; means for floatingly supporting the workpiece intermediate and in mesh with the teeth of said tool and of said propping gear; and infeed means for adjusting the position of said propping gear with respect to said tool, said infeed means comprising a shaft fixed to said propping gear and extending into said bearing member, an eccentric sleeve surrounding a portion of said shaft and rotatably received in said bearing member, and means for angularly adjusting said sleeve with respect to said bearing member.

6. A combination as set forth in claim 5, wherein the means for angularly adjusting said sleeve comprises a manually operable worm drive.

7. In a machine for shaving the teeth of gears and like workpieces, in combination, rotary cutting means comprising a gear shaped tool having serrated teeth; means comprising a bearing member and a propping gear rotatably mounted in said bearing member and spaced from said tool; means for floatingly supporting the workpiece intermediate and in mesh with the teeth of said tool and of said propping gear whereby, when said tool rotates, its teeth alone remove shavings from the teeth of the workpiece; and infeed means for adjusting said propping gear with respect to said tool in directions substantially radially of the workpiece to change the thickness of shavings removed from the teeth of the workpiece by the teeth of said tool.

8. In a machine for shaving the teeth of gears and like workpieces, in combination, a rotary gear-shaped cutting tool element having serrated teeth; a rotary non-cutting propping gear element spaced from said tool element; means for floatingly supporting the workpiece intermediate and in engagement with said elements; and means for adjusting one of said elements with respect to the other element substantially radially of the workpiece.

9. A machine for shaving the teeth of gears and like workpieces comprising, in combination, main supporting means; worktable means mounted in said main supporting means; means comprising a propping gear rotatably mounted on said worktable means, the teeth of said propping gear having smooth faces; a rotary cutting tool mounted in said main supporting means and spaced from said propping gear; and means mounted on said worktable means for floatingly supporting the workpiece between and in engagement with said cutting tool and said smooth faces of said propping gear.

10. A machine for shaving the teeth of gears and like workpieces comprising, in combination, main supporting means; worktable means mounted in said main supporting means; means comprising a propping gear rotatably mounted on said worktable means, the teeth of said propping gear having smooth faces; holder means angularly adjustably mounted on said main supporting means; a rotary cutting tool mounted in said holder means and spaced from said propping gear, said cutting tool adjustable by its holder means between a position of axial parallelism with and a position in which its axis crosses the axis of said propping gear upon angular adjustments of said holder means with respect to said main supporting means; and means mounted on said worktable means for floatingly supporting the workpiece between and in engagement with said cutting tool and said smooth faces of said propping gear.

11. A machine as set forth in claim 10, wherein the axis of said propping gear is parallel with the axis of the workpiece.

12. A machine for shaving the teeth of gears and like workpieces comprising, in combination, a frame; a bed mounted in said frame; means comprising a rotary propping gear mounted on said bed, the teeth of said propping gear having smooth faces; a rotary cutting gear mounted on said frame and spaced from said propping gear; means mounted on said bed for floatingly supporting the workpiece between and in mesh with said cutting gear and said smooth faces of said propping gear; and infeed means for moving said bed with respect to the frame so as to change the distance between said cutting gear and said propping gear.

13. A machine for shaving the teeth of gears and like workpieces comprising, in combination, a frame; a bed mounted in said frame; means comprising a rotary propping gear mounted on said bed, the teeth of said propping gear having smooth faces; a rotary cutting gear mounted on said frame and spaced from said propping gear; means mounted on said bed for floatingly supporting the workpiece between and in mesh with said cutting gear and said smooth faces of said propping gear; and infeed means for moving said propping gear with respect to the bed and with respect to said cutting gear substantially radially of the workpiece.

14. A machine for shaving the teeth of gears and like workpieces comprising, in combination, a frame; a bed mounted in said frame; means comprising a rotary propping gear mounted on said bed, the teeth of said propping gear having smooth faces; a rotary cutting gear mounted on said frame and spaced from said propping gear; means for adjusting said cutting gear with respect to said propping gear so that the axis of said cutting gear may be moved into positions of parallelism with and of inclination with respect to the axis of said propping gear; means for adjusting said propping gear so that the axis thereof may assume a position of parallelism with or inclination with respect to the axis of said cutting gear; and means mounted on said bed for floatingly supporting the workpiece between and in mesh with said cutting gear and said smooth faces of said propping gear.

15. A machine for shaving the teeth of gears and like workpieces comprising, in combination, a frame; a carrier substantially vertically reciprocably mounted in said frame; means for moving said carrier with respect to said frame; a rotary table mounted in said carrier so as to be turnable about a substantially vertical axis, said table formed with substantially horizontal ways in the upper side thereof; a bed mounted on said table and reciprocable in the longitudinal direction of said ways; means comprising a rotary propping gear mounted on said bed, the teeth of said propping gear having smooth faces; a rotary cutting gear mounted on said frame above said bed and spaced from said propping gear; and means mounted on said bed for floatingly supporting the workpiece between and in mesh with said cutting gear and said smooth faces of said propping gear.

16. A machine as set forth in claim 15, further comprising means for reciprocating said bed in the longitudinal direction of said ways.

17. A machine for shaving the teeth of gears and like workpieces comprising, in combination, a frame; a carrier substantially vertically reciprocably mounted in said frame; means for moving said carrier with respect to said frame; a rotary table mounted in said carrier so as to be turnable about a substantially vertical axis, said table formed with substantially horizontal ways in the upper side thereof; a carriage reciprocably mounted in and movable in the longitudinal direction of said ways; a bed mounted on said carriage and tiltable with respect thereto about a horizontal axis substantially perpendicular to the longitudinal direction of said ways; means comprising a rotary propping gear mounted on said bed, the teeth of said propping gear having smooth faces; a rotary cutting gear mounted on said frame above said bed and spaced from said propping gear; and means mounted on said bed for floatingly supporting the workpiece between and in mesh with said cutting gear and said smooth faces of said propping gear.

18. A machine for shaving the teeth of gears and like workpieces comprising, in combination, a frame; a carrier substantially vertically reciprocably mounted in said frame; means for moving said carrier with respect to said frame; a rotary table mounted in said carrier so as to be turnable about a substantially vertical axis, said table formed with substantially horizontal ways in the upper side thereof; a carriage reciprocably mounted in said ways; a base plate mounted on said carriage for angular adjustments about a vertical axis coinciding with said first named vertical axis; a bed mounted on said base plate for rocking movements about a horizontal axis substantially perpendicular to the longitudinal direction of said ways; means comprising a rotary propping gear mounted on said bed, the teeth of said propping gear having smooth faces; a rotary cutting gear mounted in said frame above and spaced from said propping gear; and means mounted on said bed for floatingly supporting the workpiece between and in mesh with said cutting gear and said smooth faces of said propping gear.

19. A machine for shaving the teeth of gears and like workpieces comprising, in combination, a frame; a carrier substantially vertically reciprocably mounted in said frame; means for moving said carrier with respect to said frame; a rotary table mounted in said carrier so as to be turnable about a substantially vertical axis, said table formed with substantially horizontal ways in the upper side thereof; a carriage reciprocably mounted in said ways; means for reciprocating said carriage along said ways; a base plate mounted on said carriage for angular adjustments about a vertical axis coinciding with said first named vertical axis; a bed mounted on said base plate for rocking movements about a horizontal axis substantially perpendicular to the longitudinal direction of said ways; adjustable guide cam means mounted on said carrier and operatively connected with said bed for rocking the same when the carriage is reciprocated in said ways; means comprising a rotary propping gear mounted on said bed, the teeth of said propping gear having smooth faces; a rotary cutting gear mounted in said frame above and spaced from said propping gear; means for adjusting the position of said cutting gear with respect to said frame so that the axis of said cutting gear may cross the axis of the workpiece; and means mounted on said bed for floatingly supporting the workpiece between and in mesh with said cutting gear and said smooth faces of said propping gear.

20. A machine for shaving the teeth of gears and like workpieces comprising, in combination, main supporting means; worktable means mounted in said main supporting means; means comprising a propping gear rotatably mounted on said worktable means, the teeth of said propping gear having smooth faces; a rotary cutting tool having serrated teeth, said tool mounted in said main supporting means and spaced from said propping gear; means mounted on said worktable means for floatingly supporting the workpiece between and in engagement with said cutting tool and said smooth faces of said propping gear whereby, when the cutting tool rotates, its teeth alone remove shavings from the teeth of the workpiece; and means for preventing the shavings removed by the teeth of said tool from penetrating between the workpiece and said smooth faces of said propping gear.

21. A machine as set forth in claim 20, wherein said last mentioned means comprises a source of fluid, means for conveying the fluid from said source to the workpiece, and means for advancing the fluid through said conveying means.

22. In a machine for precision finishing the teeth of gears and like workpieces, in combination, rotary cutting means; means for driving said cutting means; rotary propping means having smooth sustaining faces; means for floatingly supporting the workpiece between and in engagement with said cutting means and said smooth sustaining faces of said propping means so that the cutting means drives the workpiece and said propping means; and means for braking the workpiece to eliminate play between the teeth of the workpiece and the cutting means.

23. In a machine for shaving the teeth of gears and like workpieces, in combination; a rotary cutting tool element having serrated teeth; means for driving said tool element; rotary propping means comprising a rotary propping gear element spaced from said tool element, the teeth of said rotary propping gear element having smooth faces; means for floatingly supporting the workpiece between and in mesh with said elements so that said serrated teeth of said tool element alone remove shavings from the teeth of the workpiece when the tool element is driven; and means for braking at least one of said elements to eliminate play between the meshing teeth of the workpiece and said elements.

References Cited in the file of this patent

UNITED STATES PATENTS

| | | |
|---|---|---|
| 2,232,408 | Shaw | Feb. 18, 1941 |
| 2,254,240 | Overstedt | Sept. 2, 1941 |
| 2,542,569 | Praeg | Feb. 20, 1951 |

FOREIGN PATENTS

| | | |
|---|---|---|
| 392,385 | Great Britain | Apr. 18, 1933 |